(12) United States Patent
Stachowiak

(10) Patent No.: US 6,942,923 B2
(45) Date of Patent: Sep. 13, 2005

(54) LOW-E COATING WITH HIGH VISIBLE TRANSMISSION

(75) Inventor: Grzegorz Stachowiak, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 28 days.

(21) Appl. No.: 10/314,426

(22) Filed: Dec. 9, 2002

(65) Prior Publication Data

US 2003/0175529 A1 Sep. 18, 2003

Related U.S. Application Data

(60) Provisional application No. 60/341,837, filed on Dec. 21, 2001.

(51) Int. Cl.$^7$ ................................................. B32B 9/00
(52) U.S. Cl. ...................... 428/428; 428/432; 428/689; 428/697; 428/699; 428/701; 428/702; 428/704
(58) Field of Search ............................... 428/428, 432, 428/689, 697, 699, 701, 702, 704

(56) References Cited

U.S. PATENT DOCUMENTS

| | | |
|---|---|---|
| 3,682,528 A | 8/1972 | Apfel et al. |
| 4,229,066 A | 10/1980 | Rancourt et al. |
| 4,413,877 A | 11/1983 | Suzuki et al. |
| 4,716,086 A | 12/1987 | Gillery et al. |
| 4,799,745 A | 1/1989 | Meyer et al. |
| 4,898,790 A | 2/1990 | Finley |
| 4,965,121 A | 10/1990 | Young et al. |
| 5,071,206 A | 12/1991 | Hood et al. |
| 5,153,054 A | 10/1992 | Depauw et al. |
| 5,201,926 A | 4/1993 | Szczyrbowski et al. |
| 5,296,302 A | 3/1994 | O'Shaughnessy et al. |
| 5,302,449 A | 4/1994 | Eby et al. |
| 5,332,888 A | 7/1994 | Tausch et al. |

(Continued)

FOREIGN PATENT DOCUMENTS

| | | |
|---|---|---|
| DE | 197 51 711 | 5/1999 |
| EP | 1 174 397 | 1/2002 |
| EP | 1 238 950 | 9/2002 |
| EP | 1 329 307 | 7/2003 |
| WO | WO 98/58885 | 12/1998 |
| WO | WO 01/21540 | 3/2001 |
| WO | WO 02/04375 | 1/2002 |
| WO | WO 03/033427 | 4/2003 |

OTHER PUBLICATIONS

CRC Handbook of Chemistry and Physics, 74$^{th}$ edition, pp. 4–108.*
Department of Materials Scinece and Engineering, Electronic Materials, SION Waveguide Materials for Microphotonics, Sandland et al, p. 25.*
U.S. Appl. No. 09/997,245, filed Nov. 30, 2001 (copy attached).
U.S. Appl. No. 09/995,800, filed Nov. 29, 2001 (copy attached).
U.S. Appl. No. 09/794,224 (copy attached).
"Heat Insulating Glass Which Can Be Thermally Worked", Hironobu, 05124839, Oct. 1991.
PCT Search Report for counterpart dated Jun. 5, 2003.

Primary Examiner—Deborah Jones
Assistant Examiner—G. Blackwell-Rudasill
(74) Attorney, Agent, or Firm—Nixon & Vanderhye P.C.

(57) ABSTRACT

Coated articles are provided with an anti-reflection system(s) which enables high visible transmission and/or low visible reflection. Neutral color is also attainable in certain example embodiments. In certain example embodiments, the anti-reflection system(s) is used in conjunction with a double silver (Ag) layer stack which provides low sheet resistance and/or emissivity.

38 Claims, 6 Drawing Sheets

U.S. PATENT DOCUMENTS

| | | |
|---|---|---|
| 5,344,718 A | 9/1994 | Hartig et al. |
| 5,376,455 A | 12/1994 | Hartig et al. |
| 5,377,045 A | 12/1994 | Wolfe et al. |
| 5,521,765 A | 5/1996 | Wolfe |
| 5,557,462 A | 9/1996 | Hartig et al. |
| 5,563,734 A | 10/1996 | Wolfe et al. |
| 5,721,054 A | 2/1998 | Vandiest et al. |
| 5,770,321 A | 6/1998 | Hartig et al. |
| 5,800,933 A | 9/1998 | Hartig et al. |
| 5,834,103 A | 11/1998 | Bond et al. |
| 5,902,505 A | 5/1999 | Finley |
| 5,935,702 A * | 8/1999 | Macquart et al. ........... 428/336 |
| 5,948,131 A | 9/1999 | Neuman |
| 5,948,538 A | 9/1999 | Brochot et al. |
| 6,045,896 A | 4/2000 | Boire et al. |
| 6,059,909 A | 5/2000 | Hartig et al. |
| 6,060,178 A | 5/2000 | Krisko |
| 6,132,881 A | 10/2000 | Hartig et al. |
| 6,231,999 B1 | 5/2001 | Krisko |
| 6,238,781 B1 | 5/2001 | Anderson et al. |
| 6,287,675 B1 | 9/2001 | Guiselin et al. |
| 6,492,619 B1 * | 12/2002 | Sol .......................... 219/203 |
| 6,524,688 B1 | 2/2003 | Eby et al. |
| 6,558,800 B1 | 5/2003 | Stachowiak |
| 6,576,349 B2 | 6/2003 | Lingle et al. |
| 2002/0021495 A1 | 2/2002 | Lingle |
| 2002/0192473 A1 | 12/2002 | Gentilhomme et al. |
| 2002/0192474 A1 | 12/2002 | Lingle |
| 2003/0049464 A1 | 3/2003 | Glenn et al. |
| 2003/0150711 A1 * | 8/2003 | Laird ........................ 428/432 |

* cited by examiner

LOW-E COATING WITH HIGH VISIBLE TRANSMISSION

This application claims priority from U.S. Provisional Application No. 60/341,837, filed Dec. 21, 2001, the disclosure of which is hereby incorporated herein by reference.

BACKGROUND AND SUMMARY OF THE INVENTION

Related application (Ser. No. 09/794,224) discloses coated articles having the following layer stack, as shown in FIG. 1 herein, from the glass substrate outwardly:

TABLE 1

Example Materials/Thicknesses in Related Case

| Layer Substrate (1–10 mm) | Preferred Range (Å) | More Preferred (Å) | Example (Å) |
|---|---|---|---|
| $TiO_2$ | 0–400 Å | 50–250 Å | 100 Å |
| $Si_xN_y$ | 0–400 Å | 50–250 Å | 170 Å |
| $NiCrO_x$ | 5–100 Å | 10–50 Å | 18 Å |
| Ag | 50–250 Å | 80–120 Å | 105 Å |
| $NiCrO_x$ | 5–100 Å | 10–50 Å | 16 Å |
| $SnO_2$ | 0–800 Å | 500–850 Å | 650 Å |
| $Si_xN_y$ | 0–800 Å | 50–250 Å | 170 Å |
| $NiCrO_x$ | 5–100 Å | 10–50 Å | 18 Å |
| Ag | 50–250 Å | 80–120 Å | 105 Å |
| $NiCrO_x$ | 5–100 Å | 10–50 Å | 16 Å |
| $SnO_2$ | 0–500 Å | 100–300 Å | 150 Å |
| $Si_3N_4$ | 0–500 Å | 100–300 Å | 250 Å |

In other embodiments of the related case, the bottom titanium oxide layer may be removed or replaced with a silicon nitride layer.

While the aforesaid coated articles described in the related application provide good color, and good ultraviolet (UV) and/or infrared (IR) reflection, increased visible transmission and/or reduced visible reflection would sometimes be desirable.

Neutral color is also desirable for coated articles in certain applications. Many conventional methods of making color of a coated article more neutral result in decreased visible transmission and/or increased visible reflection. Heretofore, it has been difficult to increase visible transmission and reduce visible reflection, while at the same time providing or maintaining rather neutral color and satisfactory solar control or thermal characteristics. Whether a color is "neutral" or not is subjective, and is a function of personal taste. However, generally speaking, color moving toward a neutral color target (e.g., a*=0, b*=0, or some other neutral color target such as transmissive a*=−2 and transmissive b*=−3.4) is desired, although such targets do not have to be met in all embodiments of this invention.

In view of the above, it is an object of certain embodiments of this invention to provide a solar controlling coated article (i.e., an article including at least one and preferably two or more layers such as Ag for reflecting IR and/or UV) having increased visible transmission and/or reduced visible reflectance. In certain example non-limiting embodiments of this invention, it is an object to combine such high visible transmission and/or reduced visible reflectance with neutral color of the coated article. Alternatively, the use of an improved anti-reflection layer(s) system(s) may enable coatings to have or utilize more robust contact layer(s) (e.g., thicker for better durability) and/or thicker silver (Ag) layer(s) (i.e., improved thermal performance) while maintaining similar transmission characteristics if increased transmission is not a most desired feature (e.g., if durability is a most desired feature).

Another object of this invention is to fulfill one or more of the above-listed objects and/or needs.

DETAILED DESCRIPTION OF EXAMPLE EMBODIMENTS OF THE INVENTION

The instant invention relates to coated articles which may be used in applications including but not limited to insulating glass (IG) window units, other types of architectural windows, skylight windows, and/or other types of windows. Coated articles according to this invention include an improved anti-reflection layer(s) system for reducing visible reflectance and/or increasing visible transmission in coated articles that provide solar control (e.g., IR and/or UV reflection) functionality. Surprisingly, in certain example embodiments it has been found that certain anti-reflection layer(s) systems of the instant invention can both: (a) improve visible transmission and/or reduce visible reflectance, while at the same time (b) achieving an acceptable neutral color of the resulting coated article.

Figure 2:
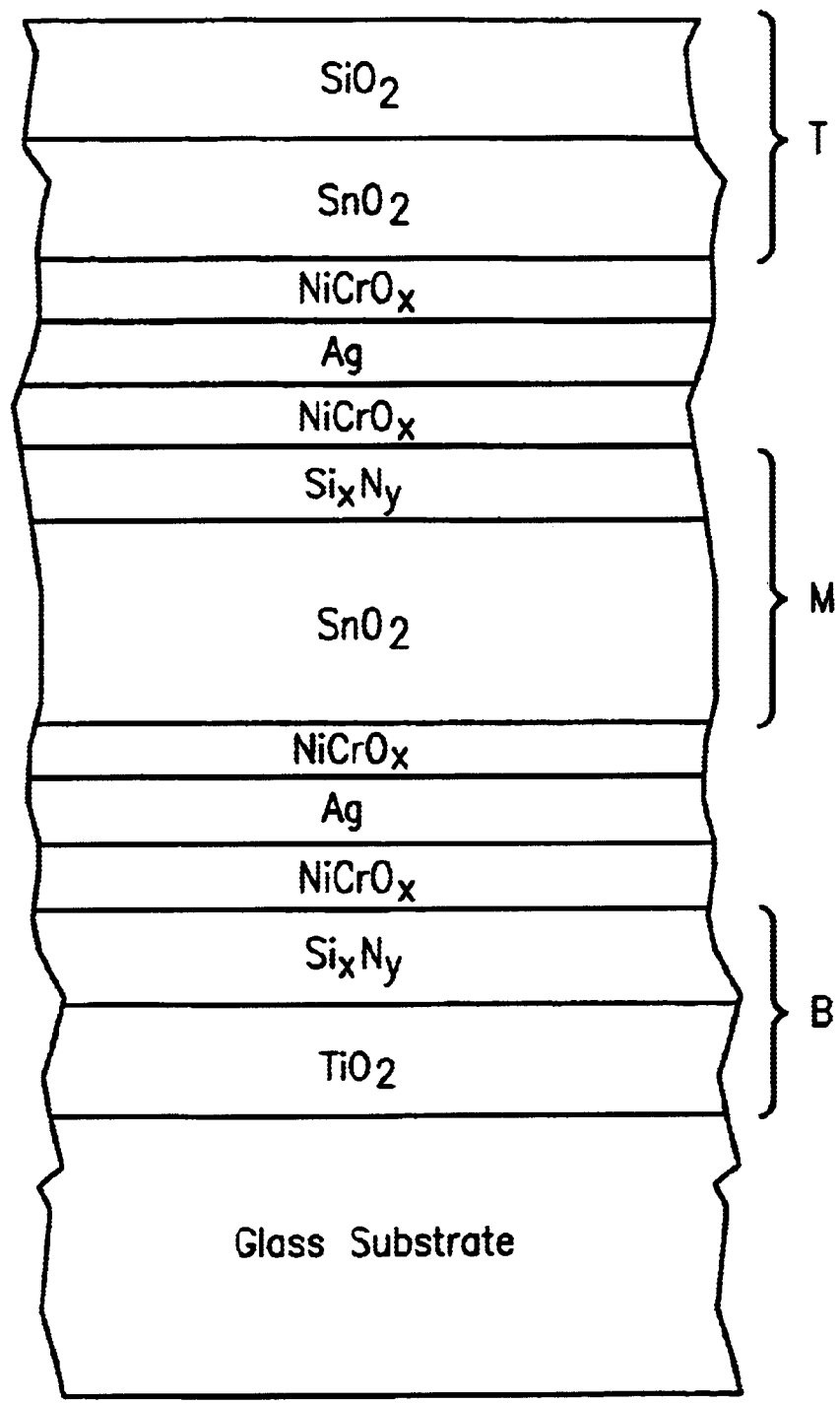
FIG. 2 is a cross sectional view of a coated article according to an embodiment of this invention.

FIG. 2 is a cross sectional view of a coated article according to an embodiment of this invention. The coated article of FIG. 2, like all other coated articles herein, may be used in any of the aforesaid applications (e.g., architectural windows, etc.). The coated article of FIG. 2 includes from the glass substrate outwardly (all indices of refraction "n" at 550 nm):

glass (n=1.51)
titanium oxide (e.g., $TiO_2$) (n=2.1 to 2.7)
silicon nitride (e.g., $Si_3N_4$) (n=1.8 to 2.2, preferably n=2.0)
nickel-chromium-oxide ($NiCrO_x$)
silver (Ag)
nickel-chromium-oxide ($NiCrO_x$)
tin oxide (e.g., $SnO_2$) (n=1.8 to 2.2, preferably n=2.0)
silicon nitride (e.g., $Si_3N_4$) (n=1.8 to 2.2, preferably n=2.0)
nickel-chromium-oxide ($NiCrO_x$)
silver (Ag)
nickel-chromium-oxide ($NiCrO_x$)
tin oxide (e.g., $SnO_2$) (n=1.8 to 2.2, preferably n=2.0)
silicon oxide (e.g., $SiO_2$) (n=1.4 to 1.7, preferably n=1.45)
air (n=1.0)

As shown in FIG. 2, the contact layers (i.e., $NiCrO_x$ layers) surround and contact the IR reflecting Ag layers. The $NiCrO_x$ layers herein are called "contact" layers because they each contact an IR reflecting layer (i.e., an Ag layer). The NiCrO$_x$ contact layers provide the most immediate chemical protection for the Ag layer, and also serve as adhesion and/or nucleation layers. The contact layers may or may not be oxidation graded as described in the related application, in different embodiments of this invention. Moreover, instead of NiCrO$_x$, one or more of the contact layers may be of or include other material(s) including but not limited to NiCr, NiCrN$_x$, NiCrO$_x$N$_y$, ZnO, Al$_2$O$_3$, TiO$_2$, ZnAlO$_x$, Ni, Cr, CrN$_x$, NiO$_x$, NbO$_x$, any combination thereof, or the like. Example thicknesses of the contact layers, and other layers herein, are discussed above in the Background and Summary section of this application.

Instead of Ag, other metallic IR reflecting materials (e.g., Au, Ag alloys, Au alloys, etc.) may be used for the IR reflecting layer(s) (this applies to all embodiments herein). The thickness of the metallic Ag layers (IR reflecting layers) is chosen in order to achieve the desired thermal performance (see example thickness ranges above). For example, the Ag layer may be from about 50–250 Å thick, in order to achieve sheet resistance (R$_s$) (before and/or after heat treatment) of less than or equal to 10.0 ohms/square, more preferably less than or equal to 8.0 ohms/square, even more preferably less than or equal to 5.0 ohms/square, and most preferably less than or equal to 4.0 ohms/square. In a similar manner, the Ag layer(s) thickness(es) are chosen so that the coating (or coated article) has a normal emissivity (E$_n$) of no greater than 0.08, more preferably no greater than 0.06, and most preferably no greater than 0.05 (before and/or after heat treatment).

The bottom ten (10) layers of the FIG. 2 coating (and the FIGS. 3–6 coatings) are discussed in the related application (incorporated herein by reference), and are not discussed herein for reasons of simplicity. See the thicknesses/materials described in the related in this regard. The focus herein lies with the provision of the top two layers in the FIG. 2 embodiment which are provided in order to increase visible transmission of the coated article and/or reduce visible reflection (glass and/or film side reflection). With respect to the FIG. 2 embodiment in particular, it will be shown below that the replacement of the top silicon nitride layer (see related, or FIG. 1 herein) with a silicon oxide layer (see FIG. 2) results in a significant increase in visible transmission. This is clearly beneficial.

By using silicon oxide (i.e., stoichiometric SiO$_2$, or alternatively a non-stoichiometric form) over the top tin oxide layer, the coating (layer system) can be characterized by the top dielectric portion T having an effective index of refraction n less than that of middle dielectric portion M, which in turn has an effective index of refraction n less than that of the bottom dielectric portion B (see FIG. 2). In other words, n$_T$<n$_M$<n$_B$, where n$_T$ is the effective index of refraction of the top dielectric portion T, n$_M$ is the effective index of refraction of the middle dielectric portion M, and n$_B$ is the effective index of refraction of the bottom dielectric portion B. As shown in FIG. 2, each of the top, middle and bottom dielectric portions T, M and B, respectively, can include a plurality of different dielectric layers, although in alternative embodiments any or all of these portions need only include a single dielectric layer. By gradually decreasing the respective effective indices of refraction "n" from the innermost or bottom dielectric portion B, to the middle dielectric portion M, and on to the top dielectric portion T toward the air, the anti-reflection system of FIG. 2 enables increased visible transmission and/or reduced visible reflection to be achieved. Surprisingly, as will be shown below in the Examples of this embodiment, the anti-reflection system also enables fairly neutral color of the coated article. Moreover, in certain example embodiments of this invention, n$_T$<=2.0. The silicon oxide layer may be from about 10–700 Å thick in certain example embodiments of this invention, more preferably from 20–600 Å thick, and most preferably from 50–500 Å thick.

As with all embodiments herein, the illustrated layers are preferably deposited/formed via sputtering (see the Examples in the related application), although other deposition techniques may certainly be used in alternative embodiments of this invention.

EXAMPLE(S) OF FIG. 2 EMBODIMENT

Figure 1:
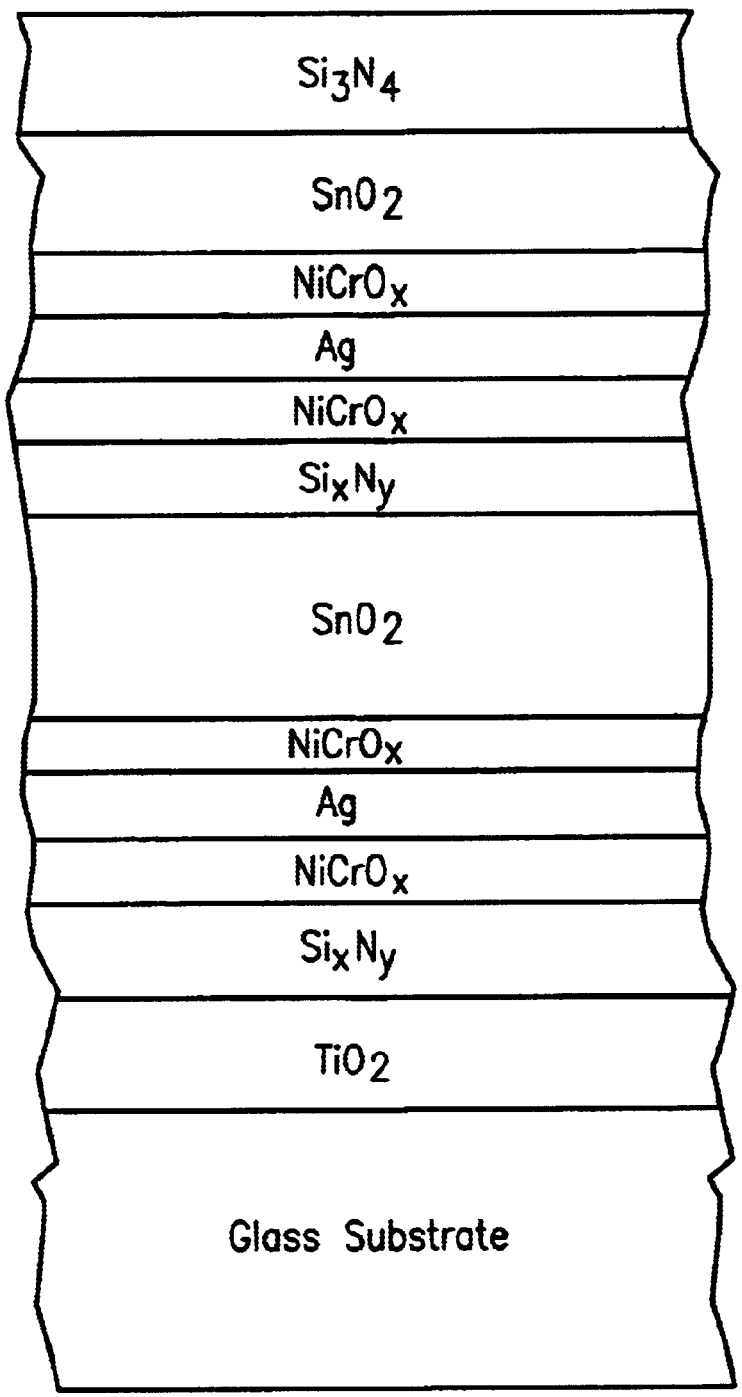
FIG. 1 is a cross sectional view of a coated article according to an embodiment of this invention, as disclosed in the related application.

The Tables below illustrate Examples 1–7 of the FIG. 2 embodiment, which are to be compared to a Comparative Example(s) (CE) similar to FIG. 1 of the instant application. Thus, the CE relates to a coating that is similar to that illustrated in the related application. For these simulation examples in the Tables below, the following indices of refraction were assumed at 550 nm: for glass, n=1.51; for Si$_3$N$_4$, n=2.0; for SiO$_x$N$_y$, n=1.72; for SiO$_2$, n=1.45; for SnO$_2$, n=2.0; and for TiO$_2$, n=2.57. The thicknesses for each of the layers in the First Table below are in angstroms (Å). The Second Table below sets forth the optical characteristics (e.g., visible transmission, color, etc.) for the Examples and CE based upon being annealed and in monolithic form. All glass substrates were the same with respect to thickness and color. No example simulation herein was heat treated. Moreover, all optical data below was Ill. C, 2 degree.

It is noted that the comparative examples (CEs) herein utilized more oxided NiCrO$_x$ layers than did the examples in the related application (this explains why the comparative examples herein, in monolithic non-heat-treated form, have higher visible transmission than monolithic non-heat treated products in the related application). However, this distinction is not relevant because all NiCrO$_x$ layers herein were assumed to have the same oxidation, so that the comparisons herein between the CEs and the Examples are thus consistent. It is also noted that the indices for all Ag and NiCrO$_x$ are assumed to be the same for all such layers in the Examples and the CEs herein.

FIRST TABLE: LAYER STRUCTURE - thicknesses (FIG. 2 embodiment)

| Glass | CE | Ex. 1 | Ex. 2 | Ex. 3 | Ex. 4 | Ex. 5 | Ex. 6 | Ex. 7 |
|---|---|---|---|---|---|---|---|---|
| TiO$_2$ | 125 Å | 125 Å | 125 Å | 125 Å | 125 Å | 125 Å | 125 Å | 125 Å |
| Si$_3$N$_4$ | 165 Å | 165 Å | 165 Å | 165 Å | 165 Å | 153 Å | 157 Å | 153 Å |
| NiCrO$_x$ | 18 Å | 18 Å | 18 Å | 18 Å | 18 Å | 18 Å | 18 Å | 18 Å |
| Ag | 98 Å | 98 Å | 98 Å | 98 Å | 98 Å | 98 Å | 98 Å | 98 Å |
| NiCrO$_x$ | 16 Å | 16 Å | 16 Å | 16 Å | 16 Å | 16 Å | 16 Å | 16 Å |
| SnO$_2$ | 672 Å | 672 Å | 672 Å | 672 Å | 672 Å | 705 Å | 724 Å | 674 Å |

-continued

FIRST TABLE: LAYER STRUCTURE - thicknesses (FIG. 2 embodiment)

| Glass | CE | Ex. 1 | Ex. 2 | Ex. 3 | Ex. 4 | Ex. 5 | Ex. 6 | Ex. 7 |
|---|---|---|---|---|---|---|---|---|
| $Si_3N_4$ | 165 Å | 165 Å | 165 Å | 165 Å | 165 Å | 165 Å | 165 Å | 165 Å |
| $NiCrO_x$ | 18 Å | 18 Å | 18 Å | 18 Å | 18 Å | 18 Å | 18 Å | 18 Å |
| Ag | 98 Å | 98 Å | 98 Å | 98 Å | 98 Å | 98 Å | 98 Å | 98 Å |
| $NiCrO_x$ | 16 Å | 16 Å | 16 Å | 16 Å | 16 Å | 16 Å | 16 Å | 16 Å |
| $SnO_2$ | 227 Å | 227 Å | 227 Å | 227 Å | 227 Å | 252 Å | 314 Å | 234 Å |
| $Si_3N_4$ | 252 Å | 0 Å | 0 Å | 0 Å | 0 Å | 0 Å | 0 Å | 0 Å |
| $SiO_2$ | 0 Å | 550 Å | 450 Å | 400 Å | 353 Å | 460 Å | 286 Å | 435 Å |

SECOND TABLE: OPTICAL PERFORMANCE (FIG. 2 embodiment; monolithic)

| | $T_{vis}$ | $a^*_t$ | $b^*_t$ | $R_{glass\ side\ (g)}$ | $a^*_g$ | $b^*_g$ | $R_{film\ side\ (f)}$ | $a^*_f$ | $b^*_f$ |
|---|---|---|---|---|---|---|---|---|---|
| Ex. 1: | 77.3% | −2.8 | 2.1 | 4.5% | 7.9 | −11.9 | 3.0% | 11.7 | −18.2 |
| Ex. 2: | 76.9% | −1.9 | 0.8 | 4.5% | 5.3 | −5.3 | 3.6% | 2.7 | −7.8 |
| Ex. 3: | 76.4% | −0.2 | −0.7 | 4.7% | 4.0 | −2.5 | 4.1% | −0.6 | −4.5 |
| Ex. 4: | 75.9% | −1.1 | 0.2 | 5.0% | 1.9 | 0.6 | 4.8% | −3.7 | −2.2 |
| Ex. 5: | 77.5% | −2.6 | 1.9 | 4.6% | 8.2 | −11.4 | 3.4% | 8.2 | −12.5 |
| Ex. 6: | 77.1% | −2.4 | 1.0 | 4.8% | 10.2 | −10.1 | 4.2% | 4.8 | −2.6 |
| Ex. 7: | 76.8% | −1.8 | 0.7 | 4.6% | 5.2 | −4.7 | 3.6% | 2.0 | −5.3 |
| CE: | 75.5% | −2.1 | 0.2 | 5.9% | 9.2 | −10.6 | 5.2% | 3.2 | −1.0 |

It can be seen from the Tables above regarding the FIG. 2 embodiment of this invention, that the anti-reflection system of the instant invention enables not only better visible transmission characteristics (i.e., increased transmission $T_{VIS}$ %), but also reduced reflection (e.g., lower glass side reflection and/or film side reflection). Moreover, fairly neutral transmissive color is also provided. In particular, each of Examples 1–7 (see FIG. 2) had better visible transmission (higher $T_{VIS}$) and better glass and/or film side reflection (lower $R_g$ and/or $R_f$) than the Comparative Example (CE). Moreover, Example 7 illustrates that the thicknesses of certain layers in the stack can be adjusted in order to achieve very neutral color (i.e., very low a* and/or b* values), while still attaining higher visible transmission.

Figure 3:
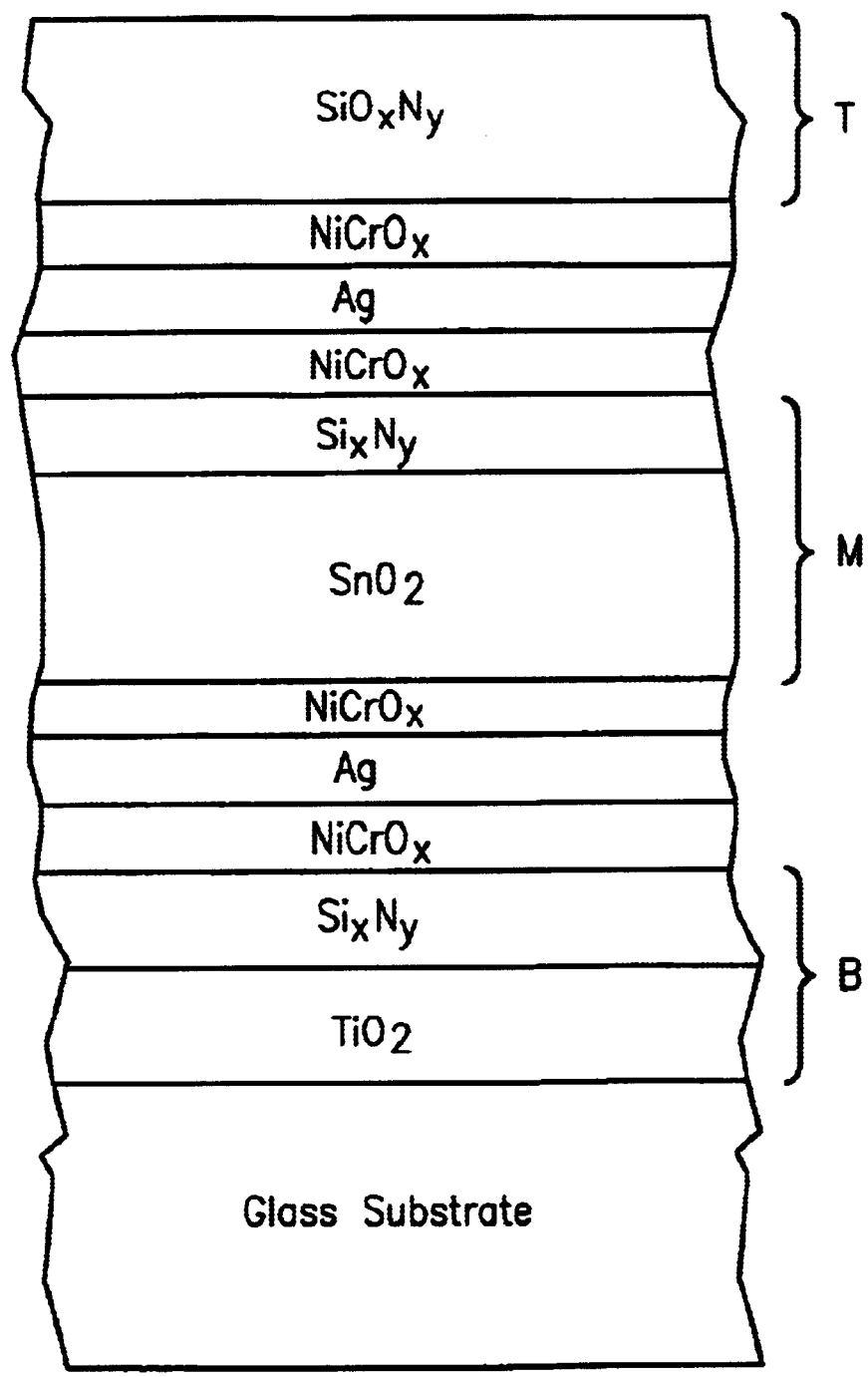
FIG. 3 is a cross sectional view of a coated article according to another embodiment of this invention.

FIG. 3 is a cross sectional view of a coated article according to another embodiment of this invention. The FIG. 3 embodiment differs from the FIG. 2 embodiment in that the top tin oxide and silicon oxide layers are replaced in FIG. 3 with a silicon oxynitride layer. The FIG. 3 embodiment differs from FIG. 1 (i.e., from the CE) in that the tin oxide and silicon nitride layers are replaced with a silicon oxynitride layer. The silicon oxynitride layer is beneficial in that its index of refraction n (at 550 nm) can be varied from 1.45 to 2.0, more preferably from 1.6 to 1.9, and most preferably from 1.65 to 1.85, in different embodiments of this invention. The index n of the silicon oxynitride layer can be varied, for example, by adjusting the oxygen and/or nitrogen gas flows used during sputtering of the same. The silicon oxynitride layer may have a constant (or approximately constant, i.e., constant plus/minus about 5%) index of refraction n throughout its entire thickness in certain embodiments of this invention, but alternatively may be oxidation and/or nitride graded so as to have an index of refraction n which varies through the thickness of the layer (e.g., the index n may gradually decrease through the thickness of the silicon oxynitride layer moving toward the air). The coated article of FIG. 3 includes from the glass substrate outwardly (all indices n at 550 nm):

glass (n=1.51)
titanium oxide (e.g., $TiO_2$) (n=2.1 to 2.7)
silicon nitride (e.g., $Si_3N_4$) (n=1.8 to 2.2, preferably n=2.0)
nickel-chromium-oxide ($NiCrO_x$)
silver (Ag)
nickel-chromium-oxide ($NiCrO_x$)
tin oxide (e.g., $SnO_2$) (n=1.8 to 2.2, preferably n=2.0)
silicon nitride (e.g., $Si_3N_4$) (n=1.8 to 2.2, preferably n=2.0)
nickel-chromium-oxide ($NiCrO_x$)
silver (Ag)
nickel-chromium-oxide ($NiCrO_x$)
silicon oxynitride (e.g., $SiO_xN_y$) (n=1.45–2.0, preferably n=1.6–1.9)
air (n=1.0)

By using silicon oxynitride over the top contact layer, the layer system can be characterized by the top dielectric portion T having an effective index of refraction n less than that of middle dielectric portion M, which in turn has an effective index of refraction n less than that of the bottom dielectric portion B. In other words, $n_T<n_M<n_B$, where $n_T$ is the effective index of refraction of the top dielectric portion T, $n_M$ is the effective index of refraction of the middle dielectric portion M, and $n_B$ is the effective index of refraction of the bottom dielectric portion B. As shown in FIG. 3, each of the top, middle and bottom dielectric portions T, M and B, respectively, can include a plurality of different dielectric layers, although in alternative embodiments any or all of these portions need only include a single dielectric layer. By gradually decreasing the respective effective indices of refraction "n" from the innermost or bottom dielectric portion B, to the middle dielectric portion M, and on to the top dielectric portion T toward the air, the anti-reflection system of FIG. 3 enables increased visible transmission to be achieved. The term "effective" means the overall effective index n in a particular portion B, T or M, regardless of how many dielectric layers are provided therein. The anti-reflection system may also enable fairly neutral color of the coated article in certain example embodiments. The silicon oxynitride layer may be from about 10–900 Å thick in certain example embodiments of this invention, more preferably from 20–600 Å thick, and most preferably from 50–500 Å thick.

EXAMPLE(S) OF FIG. 3 EMBODIMENT

The Tables below illustrate Example 1 of the FIG. 3 embodiment, compared to a Comparative Example(s) (CE) similar to FIG. 1 of the instant application. Thus, the CE relates to a coating that is similar to that illustrated in the related application. For these simulation examples in the Tables below, the following indices of refraction were assumed at 550 nm: for glass, n=1.51; for $Si_3N_4$, n=2.0; for $SiO_xN_y$, n=1.72; for $SiO_2$, n=1.45; for $SnO_2$, n=2.0; and for $TiO_2$, n=2.57. The thicknesses for each of the layers in the First Table below are in angstroms (Å). The Second Table below sets forth the optical characteristics (e.g., visible transmission, color, etc.) for Example 1 and the CE based upon being annealed and in monolithic form.

FIRST TABLE: LAYER STRUCTURE - thicknesses (FIG. 3 embodiment)

| Glass | CE | Ex. 1 |
|---|---|---|
| $TiO_2$ | 125 Å | 125 Å |
| $Si_3N_4$ | 165 Å | 165 Å |
| $NiCrO_x$ | 18 Å | 18 Å |
| Ag | 98 Å | 98 Å |
| $NiCrO_x$ | 16 Å | 16 Å |
| $SnO_2$ | 672 Å | 672 Å |
| $Si_3N_4$ | 165 Å | 165 Å |
| $NiCrO_x$ | 18 Å | 18 Å |
| Ag | 98 Å | 98 Å |
| $NiCrO_x$ | 16 Å | 16 Å |
| $SnO_2$ | 227 Å | 0 Å |
| $Si_3N_4$ | 252 Å | 0 Å |
| $SiO_xN_y$ | 0 Å | 566 Å |

SECOND TABLE: OPTICAL PERFORMANCE (FIG. 3 embodiment; monolithic)

| | $T_{vis}$ | $a^*_t$ | $b^*_t$ | $R_{glass\ side\ (g)}$ | $a^*_g$ | $b^*_g$ | $R_{film\ side\ (f)}$ | $a^*_f$ | $b^*_f$ |
|---|---|---|---|---|---|---|---|---|---|
| Ex. 1: | 77.1% | -2.4 | 1.6 | 4.4% | 7.8 | -11.4 | 3.1% | 8.1 | -13.9 |
| CE: | 75.5% | -2.1 | 0.2 | 5.9% | 9.2 | -10.6 | 5.2% | 3.2 | -1.0 |

It can be seen from the Tables above regarding the FIG. 3 embodiment of this invention, that the anti-reflection system of the instant invention enables not only better visible transmission characteristics (i.e., increased visible transmission $T_{VIS}$ %), but also reduced reflection (e.g., lower glass side reflection and/or film side visible reflection). In particular, Example 1 (see FIG. 3) had better visible transmission (higher $T_{VIS}$) and better glass and/or film side reflection (lower $R_g$ and/or $R_f$) than the Comparative Example (CE—see FIG. 1).

Figure 4:
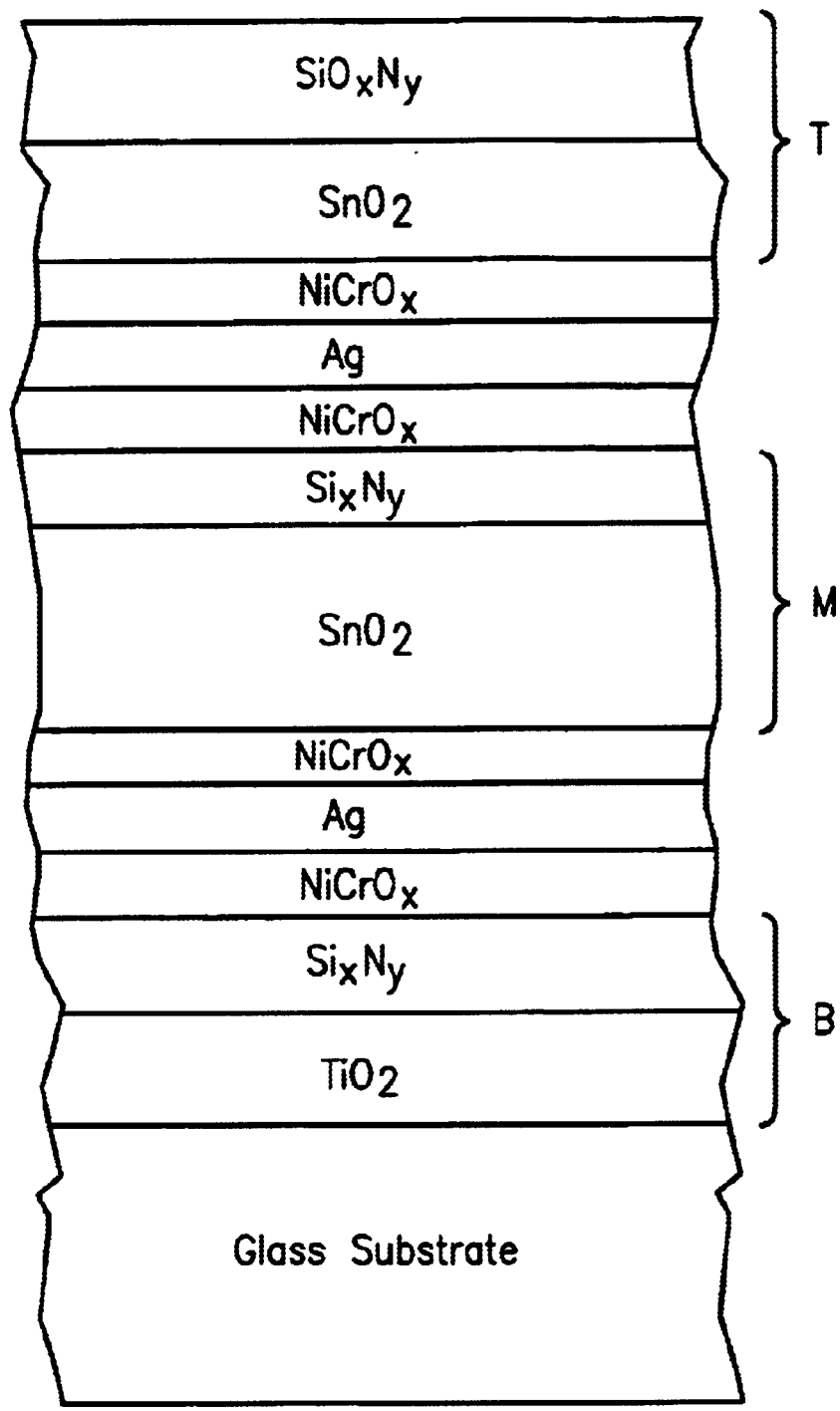
FIG. 4 is a cross sectional view of a coated article according to another embodiment of this invention.

FIG. 4 is a cross sectional view of a coated article according to another embodiment of this invention. The FIG. 4 embodiment differs from the FIG. 2 embodiment in that the silicon oxide layer is replaced in FIG. 4 with a silicon oxynitride layer. The FIG. 4 embodiment differs from FIG. 1 (i.e., from the CE) in that the top silicon nitride layer is replaced with a silicon oxynitride layer. The silicon oxynitride layer is beneficial in that its index of refraction n (at 550 nm) can be varied from 1.45 to 2.0, more preferably from 1.6 to 1.9, and most preferably from 1.65 to 1.85, in different embodiments of this invention. In this and all other silicon oxynitride inclusive embodiments herein, the silicon oxynitride layer may have a constant (or approximately constant, i.e., constant plus/minus about 5%) index of refraction n throughout its entire thickness in certain embodiments of this invention, but alternatively may be oxidation and/or nitride graded so as to have an index of refraction n which varies through the thickness of the layer (e.g., the index n may gradually decrease through the thickness of the silicon oxynitride layer moving toward the air). The coated article of FIG. 4 includes from the glass substrate outwardly (all indices n at 550 nm):

glass (n=1.51)
titanium oxide (e.g., $TiO_2$) (n=2.1 to 2.7)
silicon nitride (e.g., $Si_3N_4$) (n=1.8 to 2.2, preferably n=2.0)
nickel-chromium-oxide ($NiCrO_x$)
silver (Ag)
nickel-chromium-oxide ($NiCrO_x$)
tin oxide (e.g., $SnO_2$) (n=1.8 to 2.2, preferably n=2.0)
silicon nitride (e.g., $Si_3N_4$) (n=1.8 to 2.2, preferably n=2.0)
nickel-chromium-oxide ($NiCrO_x$)
silver (Ag)
nickel-chromium-oxide ($NiCrO_x$)
tin oxide (e.g., $SnO_2$) (n=1.8 to 2.2, preferably n=2.0)
silicon oxynitride (e.g., $SiO_xN_y$) (n=1.45–2.0, preferably n=1.6–1.9)
air (n=1.0)

By using silicon oxynitride over the top tin oxide layer and over the top contact layer, the layer system can be characterized by the top dielectric portion T having an effective index of refraction n less than that of middle dielectric portion M, which in turn has an effective index of refraction n less than that of the bottom dielectric portion B. In other words, $n_T < n_M < n_B$. The silicon oxynitride and tin oxide layers may have thicknesses as discussed above.

EXAMPLE(S) OF FIG. 4 EMBODIMENT

The Tables below illustrate Examples 1–5 of the FIG. 4 embodiment, compared to a Comparative Example(s) (CE) similar to FIG. 1 of the instant application. Thus, the CE relates to a coating that is similar to that illustrated in the related application. For these simulation examples in the Tables below, the following indices of refraction were assumed at 550 nm: for glass, n=1.51; for $Si_3N_4$, n=2.0; for $SiO_xN_y$1 n=1.72; for $SiO_2$, n=1.45; for $SnO_2$, n=2.0; and for $TiO_2$, n=2.57. The thicknesses for each of the layers in the First Table below are in angstroms (Å). The Second Table below sets forth the optical characteristics (e.g., visible transmission, color, etc.) for the Examples and CE based upon being annealed and in monolithic form.

FIRST TABLE: LAYER STRUCTURE - thicknesses (FIG. 4 embodiment)

| Glass | CE | Ex. 1 | Ex. 2 | Ex. 3 | Ex. 4 | Ex. 5 |
|---|---|---|---|---|---|---|
| $TiO_2$ | 125 Å | 125 Å | 125 Å | 125 Å | 125 Å | 125 Å |
| $Si_3N_4$ | 165 Å | 165 Å | 165 Å | 165 Å | 133 Å | 158 Å |
| $NiCrO_x$ | 18 Å | 18 Å | 18 Å | 18 Å | 18 Å | 18 Å |
| Ag | 98 Å | 98 Å | 98 Å | 98 Å | 98 Å | 98 Å |
| $NiCrO_x$ | 16 Å | 16 Å | 16 Å | 16 Å | 16 Å | 16 Å |
| $SnO_2$ | 672 Å | 672 Å | 672 Å | 731 Å | 708 Å | 671 Å |
| $Si_3N_4$ | 165 Å | 165 Å | 165 Å | 165 Å | 165 Å | 165 Å |
| $NiCrO_x$ | 18 Å | 18 Å | 18 Å | 18 Å | 18 Å | 18 Å |
| Ag | 98 Å | 98 Å | 98 Å | 98 Å | 98 Å | 98 Å |
| $NiCrO_x$ | 16 Å | 16 Å | 16 Å | 16 Å | 16 Å | 16 Å |
| $SnO_2$ | 227 Å | 227 Å | 227 Å | 262 Å | 217 Å | 110 Å |
| $Si_3N_4$ | 252 Å | 0 Å | 0 Å | 0 Å | 0 Å | 0 Å |
| $SiO_xN_y$ | 0 Å | 350 Å | 298 Å | 246 Å | 315 Å | 409 Å |

SECOND TABLE: OPTICAL PERFORMANCE (FIG. 4 embodiment; monolithic)

| | $T_{vis}$ | $a^*_t$ | $b^*_t$ | $R_{glass\,side\,(g)}$ | $a^*_g$ | $b^*_g$ | $R_{film\,side\,(f)}$ | $a^*_f$ | $b^*_f$ |
|---|---|---|---|---|---|---|---|---|---|
| Ex. 1: | 76.6% | -2.2 | 0.6 | 4.9% | 8.6 | -9.4 | 3.8% | 5.0 | -4.3 |
| Ex. 2: | 76.3% | -1.5 | -0.2 | 4.9% | 6.1 | -4.0 | 4.1% | -1.1 | 2.2 |
| Ex. 3: | 77.0% | -2.5 | 1.2 | 4.8% | 11.2 | -11.1 | 4.4% | 5.1 | -2.6 |
| Ex. 4: | 76.9% | -2.3 | 1.0 | 4.8% | 9.7 | -10.1 | 3.9% | 5.2 | -1.8 |
| Ex. 5: | 76.4% | -1.5 | 0.3 | 4.7% | 4.7 | -3.3 | 3.9% | -0.5 | -2.0 |
| CE: | 75.5% | -2.1 | 0.2 | 5.9% | 9.2 | -10.6 | 5.2% | 3.2 | -1.0 |

It can be seen from the Tables above regarding the FIG. 4 embodiment of this invention, that the anti-reflection system of the instant invention enables not only better visible transmission characteristics (i.e., increased visible transmission $T_{VIS}$ %), but also reduced reflection (e.g., lower glass side reflection and/or film side visible reflection). Moreover, fairly neutral color can also be provided. In particular, Examples 1–5 (see FIG. 4) had better visible transmission (higher $T_{VIS}$) and better glass and/or film side visible reflection (lower $R_g$ and/or $R_f$) than the Comparative Example (CE—see FIG. 1).

Figure 5:
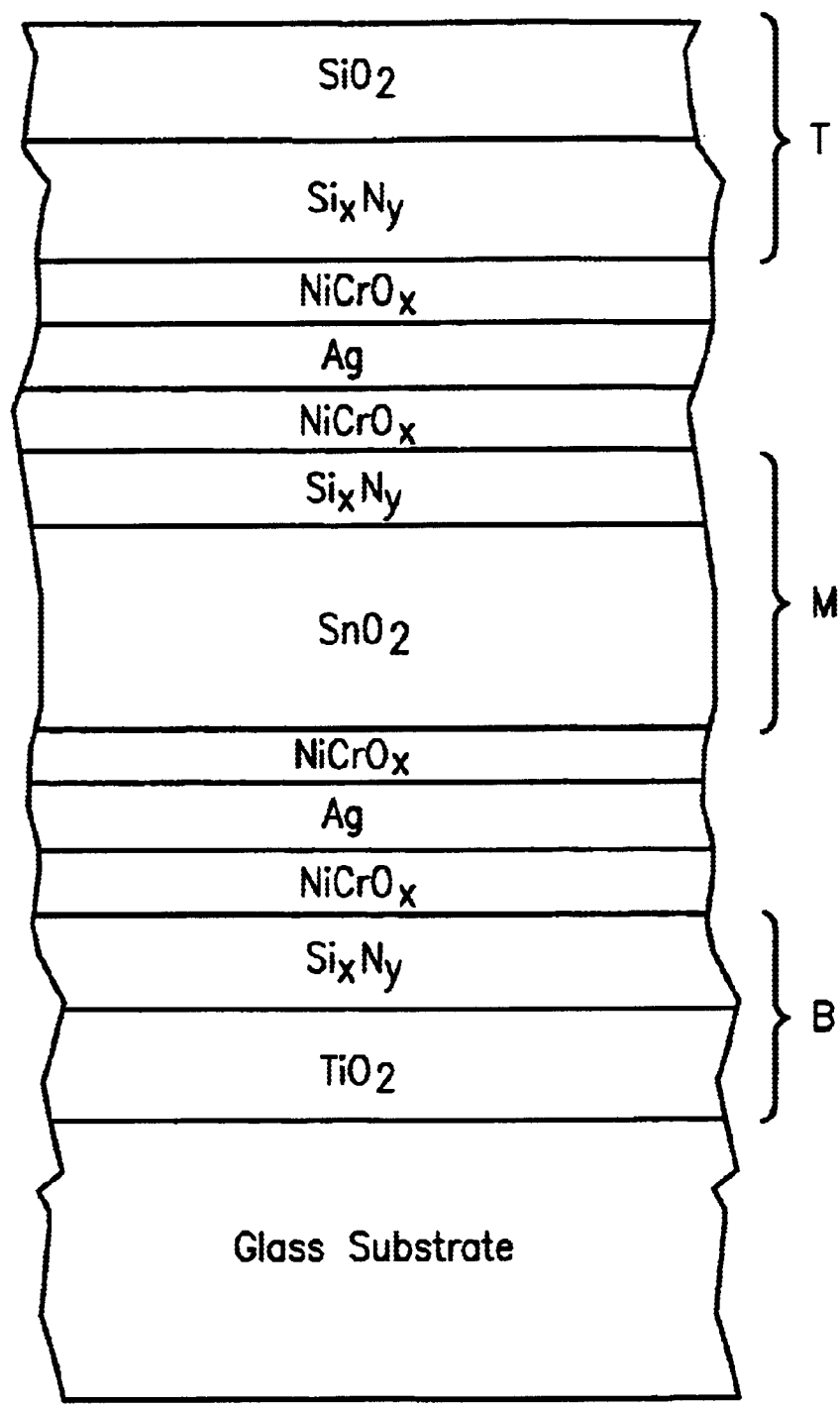
FIG. 5 is a cross sectional view of a coated article according to another embodiment of this invention.

FIG. 5 is a cross sectional view of a coated article according to another embodiment of this invention. The upper dielectric portion T includes a silicon nitride (stoichiometric or non-stoichiometric, as in all embodiments) layer and a silicon oxide layer (stoichiometric or non-stoichiometric, as in all embodiments) in this embodiment. The coated article of FIG. 5 includes from the glass substrate outwardly (all indices n at 550 nm):

glass (n=1.51)

titanium oxide (e.g., $TiO_2$) (n=2.1 to 2.7)

silicon nitride (e.g., $Si_3N_4$) (n=1.8 to 2.2, preferably n=2.0)

nickel-chromium-oxide ($NiCrO_x$)

silver (Ag)

nickel-chromium-oxide ($NiCrO_x$)

tin oxide (e.g., $SnO_2$) (n=1.8 to 2.2, preferably n=2.0)

silicon nitride (e.g., $Si_3N_4$) (n=1.8 to 2.2, preferably n=2.0)

nickel-chromium-oxide ($NiCrO_x$)

silver (Ag)

nickel-chromium-oxide ($NiCrO_x$)

tin oxide (e.g., $SnO_2$) (n=1.8 to 2.2, preferably n=2.0)

silicon oxide (e.g., $SiO_2$) (n=1.4 to 1.7, preferably n=1.45)

air (n=1.0)

By using silicon oxide and silicon nitride over the top contact layer, the coating (layer system) can be characterized by the top dielectric portion T having an effective index of refraction n less than that of middle dielectric portion M, which in turn has an effective index of refraction n less than that of the bottom dielectric portion B. In other words, $n_T < n_M < n_B$. The silicon oxide and silicon nitride layers may have thicknesses as discussed above. The FIG. 5 embodiment is also advantageous in that the top silicon oxide layer and the top silicon nitride layer can be sputtered from the same Si target, or from the same type of Si target, with the difference in sputtering comprising a difference in gas flow (i.e., oxygen gas vs. nitrogen gas).

EXAMPLE(S) OF FIG. 5 EMBODIMENT

The Tables below illustrate Example 1 of the FIG. 5 embodiment, compared to a Comparative Example(s) (CE) similar to FIG. 1 of the instant application. Thus, the CE relates to a coating that is similar to that illustrated in the related application. For these simulation examples in the Tables below, the following indices of refraction were assumed at 550 nm: for glass, n=1.51; for $Si_3N_4$, n=2.0; for $SiO_xN_y$, n=1.72; for $SiO_2$, n=1.45; for $SnO_2$, n=2.0; and for $TiO_2$, n=2.57. The thicknesses for each of the layers in the First Table below are in angstroms (Å). The Second Table below sets forth the optical characteristics (e.g., visible transmission, color, etc.) for the Example and CE based upon being annealed (non-HT) and in monolithic form.

FIRST TABLE: LAYER STRUCTURE - thicknesses (FIG. 5 embodiment)

| Glass | CE | Ex. 1 |
|---|---|---|
| $TiO_2$ | 125 Å | 125 Å |
| $Si_3N_4$ | 165 Å | 152 Å |
| $NiCrO_x$ | 18 Å | 18 Å |
| Ag | 98 Å | 98 Å |
| $NiCrO_x$ | 16 Å | 16 Å |
| $SnO_2$ | 672 Å | 707 Å |
| $Si_3N_4$ | 165 Å | 165 Å |
| $NiCrO_x$ | 18 Å | 18 Å |
| Ag | 98 Å | 98 Å |
| $NiCrO_x$ | 16 Å | 16 Å |
| $SnO_2$ | 227 Å | 0 Å |
| $Si_3N_4$ | 252 Å | 253 Å |
| $SiO_2$ | 0 Å | 457 Å |

SECOND TABLE: OPTICAL PERFORMANCE
(FIG. 5 embodiment; monolithic)

|  | $T_{vis}$ | $a^*_t$ | $b^*_t$ | $R_{glass}$ side (g) | $a^*_g$ | $b^*_g$ | $R_{film\ side\ (f)}$ | $a^*_f$ | $b^*_f$ |
|---|---|---|---|---|---|---|---|---|---|
| Ex. 1: | 77.4% | −2.6 | 1.9 | 4.6% | 8.4 | −11.5 | 3.5% | 8.8 | −12.8 |
| CE: | 75.5% | −2.1 | 0.2 | 5.9% | 9.2 | −10.6 | 5.2% | 3.2 | −1.0 |

It can be seen from the Tables above regarding the FIG. 5 embodiment of this invention, that the anti-reflection system of the instant invention enables not only better visible transmission characteristics (i.e., increased visible transmission $T_{VIS}$%), but also reduced visible reflection (e.g., lower glass side reflection and/or film side visible reflection). Fairly neutral color is also provided. Example 1 (see FIG. 5) has better visible transmission (higher $T_{VIS}$) and better glass and/or film side reflection (lower $R_g$ and/or $R_f$) than the Comparative Example (CE—see FIG. 1).

Figure 6:
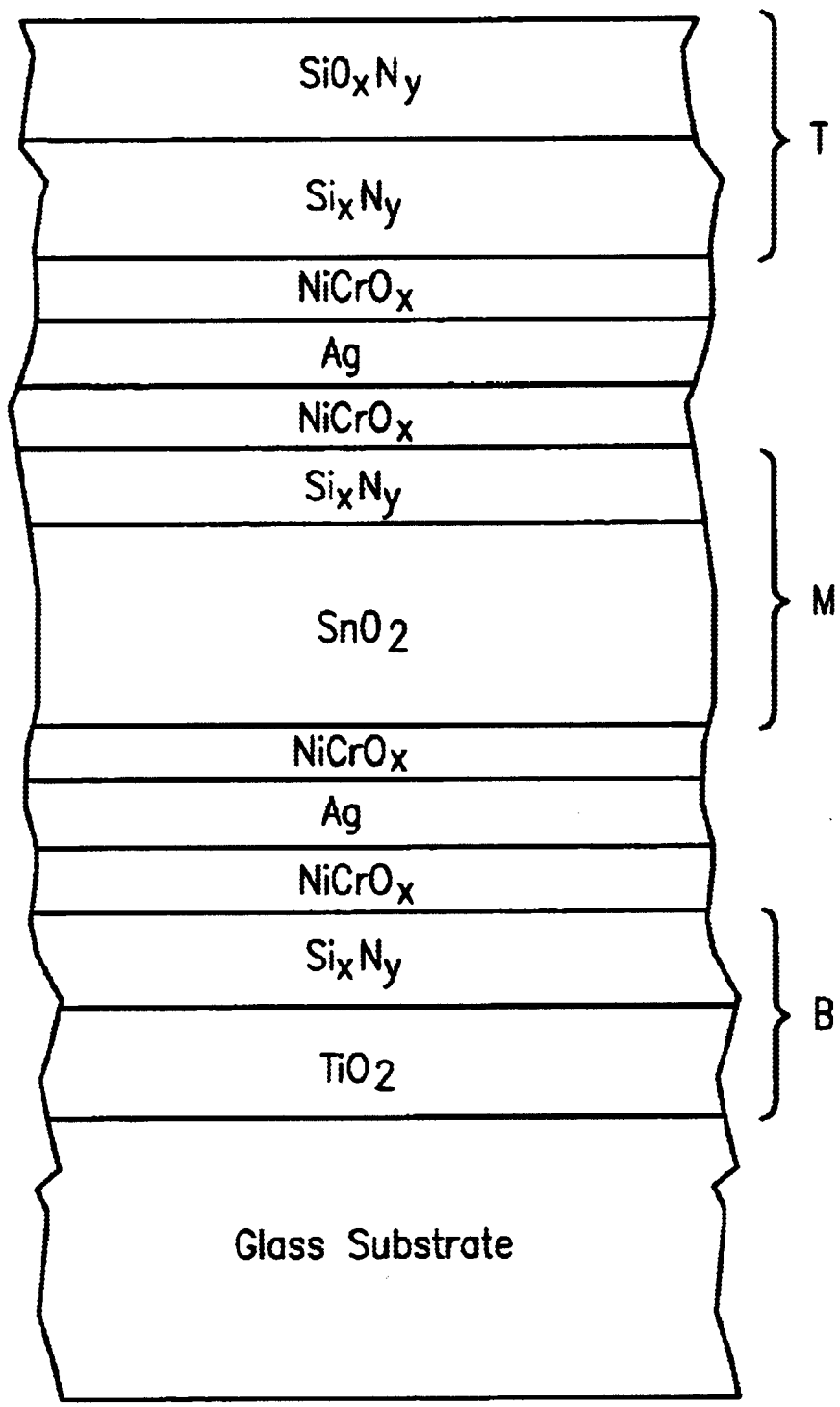
FIG. 6 is a cross sectional view of a coated article according to another embodiment of this invention.

FIG. 6 is a cross sectional view of a coated article according to another embodiment of this invention. The upper dielectric area includes a silicon nitride (stoichiometric or non-stoichiometric) layer and a silicon oxynitride layer in this embodiment. The coated article of FIG. 6 includes from the glass substrate outwardly (all indices n at 550 nm):

glass (n=1.51)
titanium oxide (e.g., $TiO_2$) (n=2.1 to 2.7)
silicon nitride (e.g., $Si_3N_4$) (n=1.8 to 2.2, preferably n=2.0)
nickel-chromium-oxide ($NiCrO_x$)
silver (Ag)
nickel-chromium-oxide ($NiCrO_x$)
tin oxide (e.g., $SnO_2$) (n=1.8 to 2.2, preferably n=2.0)
silicon nitride (e.g., $Si_3N_4$) (n=1.8 to 2.2, preferably n=2.0)
nickel-chromium-oxide ($NiCrO_x$)
silver (Ag)
nickel-chromium-oxide ($NiCrO_x$)
silicon nitride (e.g., $Si_3N_4$) (n=1.8 to 2.2, preferably n=2.0)
silicon oxynitride (e.g., $SiO_xN_y$) (n=1.45–2.0, preferably n=1.6–1.9)
air (n=1.0)

By using silicon oxynitride and silicon nitride over the top contact layer, the coating (layer system) can be characterized by the top dielectric portion T having an effective index of refraction n less than that of middle dielectric portion M, which in turn has an effective index of refraction n less than that of the bottom dielectric portion B. In other words, $n_T < n_M < n_B$. The silicon oxide and silicon nitride layers may have thicknesses as discussed above.

EXAMPLE(S) OF FIG. 6 EMBODIMENT

The Tables below illustrate Example 1 of the FIG. 6 embodiment, compared to a Comparative Example(s) (CE) similar to FIG. 1 of the instant application. Thus, the CE relates to a coating that is similar to that illustrated in the related application. For these simulation examples in the Tables below, the following indices of refraction were assumed at 550 nm: for glass, n=1.51; for $Si_3N_4$, n=2.0; for $SiO_xN_y$, n=1.72; for $SiO_2$, n=1.45; for $SnO_2$, n=2.0; and for $TiO_2$, n=2.57. The thicknesses for each of the layers in the First Table below are in angstroms (Å). The Second Table below sets forth the optical characteristics (e.g., visible transmission, color, etc.) for the Examples based upon being annealed and in monolithic form.

FIRST TABLE: LAYER STRUCTURE - thicknesses
(FIG. 6 embodiment)

| Glass | CE | Ex. 1 |
|---|---|---|
| $TiO_2$ | 125 Å | 125 Å |
| $Si_3N_4$ | 165 Å | 154 Å |
| $NiCrO_x$ | 18 Å | 18 Å |
| Ag | 98 Å | 98 Å |
| $NiCrO_x$ | 16 Å | 16 Å |
| $SnO_2$ | 672 Å | 722 Å |
| $Si_3N_4$ | 165 Å | 165 Å |
| $NiCrO_x$ | 18 Å | 18 Å |
| Ag | 98 Å | 98 Å |
| $NiCrO_x$ | 16 Å | 16 Å |
| $SnO_2$ | 227 Å | 0 Å |
| $Si_3N_4$ | 252 Å | 198 Å |
| $SiO_xN_y$ | 0 Å | 336 Å |

SECOND TABLE: OPTICAL PERFORMANCE
(FIG. 6 embodiment; monolithic)

|  | $T_{vis}$ | $a^*_t$ | $b^*_t$ | $R_{glass}$ side (g) | $a^*_g$ | $b^*_g$ | $R_{film}$ side (f) | $a^*_f$ | $b^*_f$ |
|---|---|---|---|---|---|---|---|---|---|
| Ex. 1: | 77.0% | −2.5 | 1.3 | 4.7% | 10.2 | −10.1 | 4.0% | 6.4 | −5.4 |
| CE: | 75.5% | −2.1 | 0.2 | 5.9% | 9.2 | −10.6 | 5.2% | 3.2 | −1.0 |

It can be seen from the Tables above regarding the FIG. 6 embodiment of this invention, that the anti-reflection system of the instant invention enables not only better visible transmission characteristics (i.e., increased visible transmission $T_{VIS}$ %), but also reduced visible reflection (e.g., lower glass side reflection and/or film side visible reflection). Moreover, neutral color is also provided. Example 1 (see FIG. 6) has better visible transmission (higher $T_{VIS}$) and better glass and/or film side reflection (lower $R_g$ and/or $R_f$) than the Comparative Example (CE—see FIG. 1).

Accordingly, coated articles of certain example embodiments of this invention are characterized by one or more of the following parameters:

| Characteristic | General | More Preferred | Most Preferred |
|---|---|---|---|
| $T_{vis}$ (Ill. C, 2 deg.): | >=70% | >=75% | >=76.5% |
| $R_gY$ (Ill. C, 2 deg.): | <=11% | <=9% | <=5.0% |
| $R_fY$ (Ill. C; 2 deg.): | <=11% | <=9% | <=5.0% |
| $T_{solar}$: | <=50% | <=48% |  |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example and without limitation, materials other than those described above may be used in other embodiments of this invention without departing from the spirit of this invention.

What is claimed is:

1. A coated article including a coating supported by a glass substrate, the coating comprising:
   first and second infrared (IR) reflecting layers comprising silver (Ag);
   a first dielectric layer having an index of refraction n<=3.0 provided between the first IR reflecting layer and the glass substrate;
   a second dielectric layer having an index of refraction 1.8<=n<2.2 provided between the first and second IR reflecting layers, wherein the second dielectric layer has an index of refraction n less than the index of refraction n of the first dielectric layer;
   a third dielectric layer comprising silicon oxynitride provided over the first and second IR reflecting layers, said third dielectric layer comprising silicon oxynitride having an index of refraction n less than the index of refraction n of the second dielectric layer;
   wherein the coated article has a visible transmission of at least 70%; and
   wherein each of the first and second IR reflecting layers comprising Ag is sandwiched between and contacts a pair of contact layers, and wherein at least one of the contact layers adjacent each IR reflecting layer comprises at least one of NiCr, NiCrO$_x$, and NiCrN$_x$,
   at least one of the contact layers comprises Ni and Cr.

2. The coated article of claim 1, wherein the third dielectric layer comprising silicon oxynitride has an index of refraction 1.45<=n<=2.0.

3. The coated article of claim 2, wherein the third dielectric layer comprising silicon oxynitride has an index of refraction 1.6<=n<=1.9.

4. The coated article of claim 1, wherein the first dielectric layer comprises titanium oxide.

5. A coated article including a coating supported by a glass substrate, the coating comprising:
   first and second infrared (IR) reflecting layers comprising silver (Ag);
   a first dielectric layer comprising an oxide of titanium and having an index of refraction n<=3.0 provided between the first IR reflecting layer and the glass substrate;
   a second dielectric layer having an index of refraction 1.8<=n<=2.2 provided between the first and second IR reflecting layers, wherein the second dielectric layer has an index of refraction n less than the index of refraction n of the first dielectric layer;
   a third dielectric layer comprising silicon oxynitride provided over the first and second IR reflecting layers, said third dielectric layer comprising silicon oxynitride having an index of refraction n less than the index of refraction n of the second dielectric layer;
   wherein the coated article has a visible transmission of at least 70%; and
   a layer comprising silicon nitride located between the first IR reflecting layer and the first dielectric layer comprising the oxide of titanium.

6. The coated article of claim 1, wherein the second dielectric layer comprises tin oxide.

7. A coated article including a coating supported by a glass substrate, the coating comprising:
   first and second infrared (IR) reflecting layers comprising silver (Ag);
   a first dielectric layer having an index of refraction n<=3.0 provided between the first IR reflecting layer and the glass substrate;
   a second dielectric layer comprising tin oxide and having an index of refraction 1.8<=n<=2.2 provided between the first and second IR reflecting layers, wherein the second dielectric layer has an index of refraction n less than the index of refraction n of the first dielectric layer;
   a third dielectric layer comprising silicon oxynitride provided over the first and second IR reflecting layers, said third dielectric layer comprising silicon oxynitride having an index of refraction n less than the index of refraction n of the second dielectric layer;
   wherein the coated article has a visible transmission of at least 70%; and
   another dielectric layer comprising silicon nitride provided between the first IR reflecting layer and the second dielectric layer comprising tin oxide.

8. The coated article of claim 1, further comprising another dielectric layer comprising tin oxide provided between the third dielectric layer comprising silicon oxynitride and the second IR reflecting layer.

9. A coated article including a coating supported by a glass substrate, the coating comprising:
   first and second infrared (IR) reflecting layers comprising silver (Ag);
   a first dielectric layer having an index of refraction n<=3.0 provided between the first IR reflecting layer and the glass substrate;
   a second dielectric layer having an index of refraction 1.8<=n<=2.2 provided between the first and second IR reflecting layers, wherein the second dielectric layer has an index of refraction n less than the index of refraction n of the first dielectric layer;
   a third dielectric layer comprising silicon oxynitride provided over the first and second IR reflecting layers, said third dielectric layer comprising silicon oxynitride having an index of refraction n less than the index of refraction n of the second dielectric layer;
   wherein the coated article has a visible transmission of at least 70%; and
   another dielectric layer comprising silicon nitride provided between the third dielectric layer comprising silicon oxynitride and the second IR reflecting layer.

10. The coated article of claim 1, wherein the coated article is characterized by a visible transmission of at least 75%, a sheet resistance ($R_s$) of no greater than 10 ohms/square, and a glass side visible reflectance <=9%.

11. The coated article of claim 1, wherein the coated article has a visible transmission of at least 76.5%.

12. The coated article of claim 1, wherein the third dielectric layer comprising silicon oxynitride is at least one of oxidation graded and nitrogen graded, so that an index of refraction n of the third dielectric layer comprising silicon oxynitride changes from a first value in a first portion of the third dielectric layer to a smaller second value in a second portion of the third dielectric layer, wherein the second portion of the third dielectric layer comprising silicon oxynitride with the smaller index of refraction n is further from the IR reflecting layers than is the first portion of the third dielectric layer.

13. An IG window unit comprising the coated article of claim 1.

14. A coated article including a coating supported by a glass substrate, the coating comprising, from the glass substrate outwardly:
a first dielectric layer comprising titanium oxide;
a first contact layer comprising at least one of NiCr, NiCrO$_x$ and NiCrN$_x$;
a first IR reflecting layer comprising Ag;
a second contact layer comprising at least one of NiCr, NiCrO$_x$ and NiCrN$_x$;
a second dielectric layer comprising tin oxide;
a third contact layer comprising at least one of NiCr, NiCrO$_x$ and NiCrN$_x$;
a second IR reflecting layer comprising Ag;
a fourth contact layer comprising at least one of NiCr, NiCrO$_x$ and NiCrN$_x$;
a third dielectric layer comprising silicon oxynitride, the third dielectric layer having an index of refraction less than of the second dielectric layer; and
wherein the coated article has a sheet resistance (R$_s$) of no greater than 10 ohms/square.

15. The coated article of claim 14, wherein the coated article has a visible transmission of at least 70%.

16. The coated article of claim 15, wherein the coated article has a visible transmission of at least 75%.

17. The coated article of claim 14, further comprising another dielectric layer comprising silicon nitride provided between and contacting the first dielectric layer comprising titanium oxide and the first contact layer.

18. The coated article of claim 14, further comprising another dielectric layer comprising silicon nitride provided between the second dielectric layer comprising tin oxide and the third contact layer.

19. The coated article of claim 14, further comprising another dielectric layer comprising tin oxide provided between and contacting the third dielectric layer comprising silicon oxynitride and the fourth contact layer.

20. The coated article of claim 14, further comprising another dielectric layer comprising silicon nitride provided between the third dielectric layer comprising silicon oxynitride and the fourth contact layer.

21. The coated article of claim 14, wherein the third dielectric layer comprising silicon oxynitride is at least one of oxidation graded and nitrogen graded, so that an index of refraction n of the third dielectric layer comprising silicon oxynitride changes from a first value in a first portion of the third dielectric layer to a smaller second value in a second portion of the third dielectric layer, wherein the second portion of the third dielectric layer comprising silicon oxynitride with the smaller index of refraction n is further from the IR reflecting layers than is the first portion of the third dielectric layer.

22. A window comprising the coated article of claim 14.

23. A coated article including a coating supported by a glass substrate, the coating comprising:
first and second infrared (IR) reflecting layers comprising at least one of Ag and Au;
a first dielectric layer having an index of refraction n<=3.0 provided between the first IR reflecting layer and the glass substrate;
a second dielectric layer having an index of refraction n less than that of the first dielectric layer provided between the first and second IR reflecting layers;
a third dielectric layer comprising silicon oxide provided over the first and second IR reflecting layers, said third dielectric layer comprising silicon oxide having an index of refraction n less than that of the second dielectric layer.
a dielectric layer comprising tin oxide provided between the second IR reflecting layer and the third dielectric layer comprising silicon oxide.

24. The coated article of claim 23, wherein said first and second IR reflecting layers each are metallic and comprise Ag.

25. The coated article of claim 23, wherein each of the first and second IR reflecting layers is sandwiched between and contacts a pair of contact layers, and wherein at least one of the contact layers comprises at least one of NiCr, NiCrO$_x$, and NiCrN$_x$.

26. The coated article of claim 23, wherein at least one of the contact layers comprises Ni and Cr.

27. The coated article of claim 23, wherein the first dielectric layer comprises titanium oxide.

28. The coated article of claim 23, wherein the second dielectric layer comprises at least one of tin oxide and silicon nitride.

29. The coated article of claim 23, wherein the coated article is characterized by a visible transmission of at least 70%, a sheet resistance (R$_s$) of no greater than 10 ohms/square, and a glass side visible reflectance <=9%.

30. The coated article of claim 23, wherein the coated article has a visible transmission of at least 76.5%.

31. A window comprising the coated article of claim 23.

32. A coated article including a coating supported by a glass substrate, the coating comprising, from the glass substrate outwardly:
a first dielectric layer comprising at least one of silicon nitride and titanium oxide;
a first contact layer;
a first IR reflecting layer comprising Ag;
a second contact layer comprising at least one of NiCr, NiCrO$_x$ and NiCrN$_x$;
a second dielectric layer comprising at least one of tin oxide and silicon nitride;
a third contact layer;
a second IR reflecting layer comprising Ag;
a fourth contact layer comprising at least one of NiCr, NiCrO$_x$ and NiCrN$_x$;
a third dielectric layer comprising at least one of silicon oxide and silicon oxynitride provided over all four contact layers and over the first and second IR reflecting layers; the third dielectric layer having an index of refraction (n) less than that of the second dielectric layer; and
wherein the coated article has a visible transmission of at least 70% and a sheet resistance (R$_s$) of no greater than 10 ohms/square.

33. The coated article of claim 32, wherein the coated article has a visible transmission of at least 75%.

34. The coated article of claim 32, wherein the coated article has a visible transmission of at least 76.5%.

35. The coated article of claim 32, wherein the first dielectric layer comprises titanium oxide, and the coated article further comprises another dielectric layer comprising silicon nitride provided between the first dielectric layer comprising titanium oxide and the first contact layer.

36. The coated article of claim 32, wherein the second dielectric layer comprises tin oxide, and the coated article further comprises another dielectric layer comprising silicon nitride provided between the second dielectric layer comprising tin oxide and the third contact layer.

37. The coated article of claim 32, wherein the third dielectric layer comprises silicon oxide, and the coated article further comprises a layer comprising tin oxide located between the fourth contact layer and the third dielectric layer comprising silicon oxide.

38. The coated article of claim 32, wherein the third dielectric layer comprises silicon oxide, and the coated article further comprises a layer comprising silicon nitride located between the fourth contact layer and the third dielectric layer comprising silicon oxide.

* * * * *